United States Patent Office 3,553,603
Patented Jan. 5, 1971

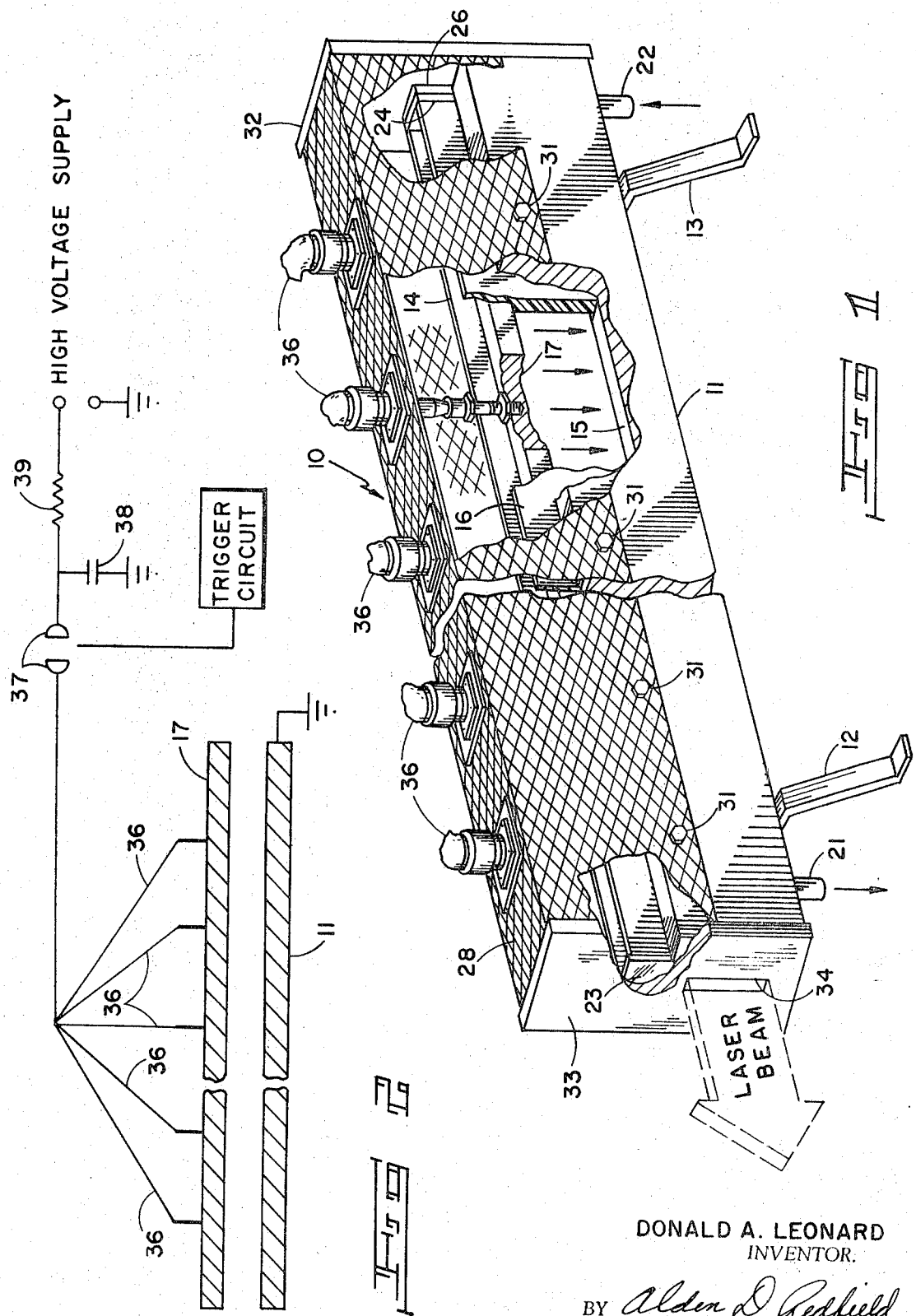

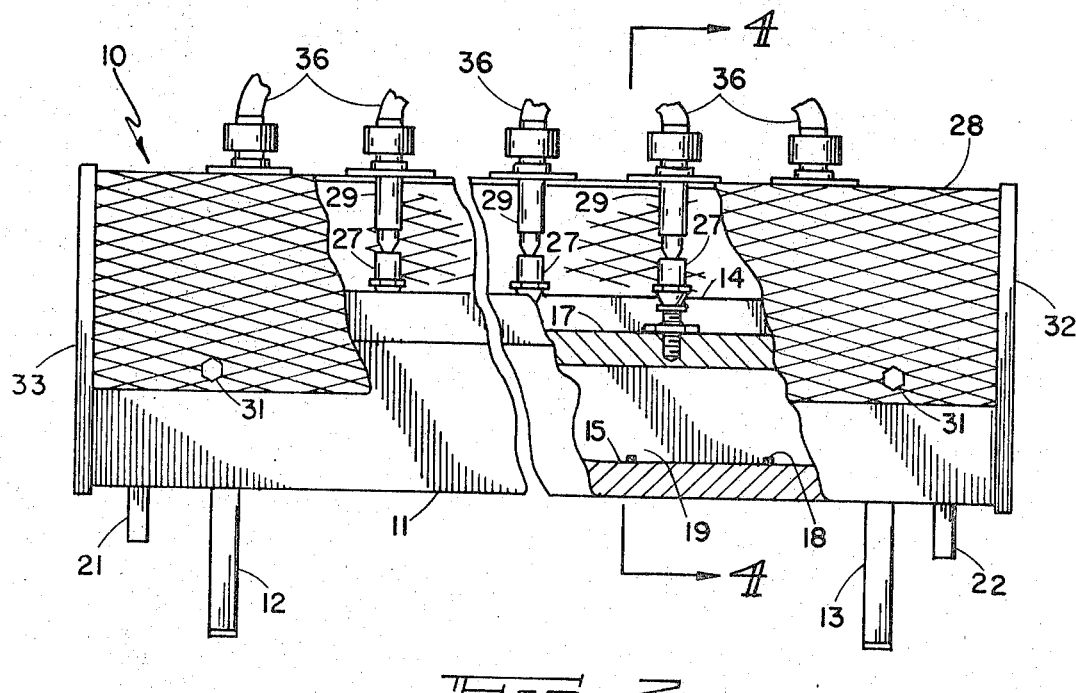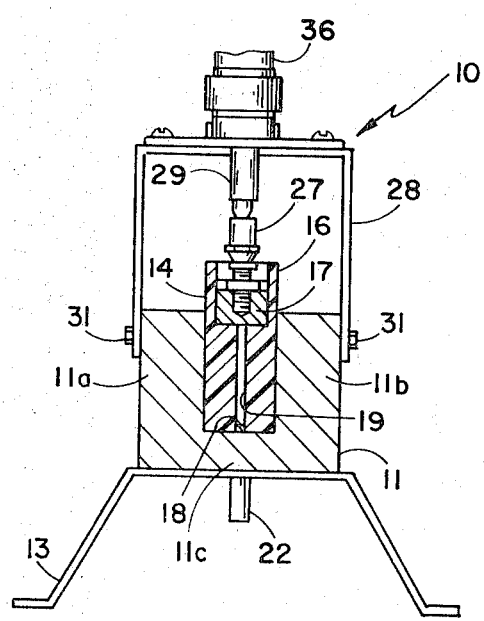

3,553,603
LASER DEVICE UTILIZING AN ELECTRIC FIELD ACROSS A NONRESONANT OPTICAL CAVITY
Donald A. Leonard, Stoneham, Mass., assignor to Avco Corporation, Cincinnati, Ohio, a corporation of Delaware
Filed Mar. 21, 1966, Ser. No. 536,094
Int. Cl. H01s 3/00
U.S. Cl. 331—94.5                                       16 Claims

ABSTRACT OF THE DISCLOSURE

A laser type device wherein a driving electric field is periodically applied in a cross field geometry across a cavity. An optically resonant cavity is not necessary to produce an output beam, the longitudinal axis of which is perpendicular to the driving electric field. The driving electric field is provided with a fast-rise current pulse, the inductance of current paths in the discharge region being substantially uniform and as small as possible.

---

This invention relates to a device for producing light at high output power levels and in particular to a laser device which employs a gas discharge created by a pulsed electric field.

Heretofore, various types of laser devices have been proposed employing gas mixture as the negative temperature medium. These laser devices have generally taken the form of a gas discharge channel having an electrode at each end and a voltage applied down the length of the discharge channel between the electrodes. Many of these devices have been complex in design and operation and most have proven to be extremely limited in efficiency of operation.

It is a general object of the present invention to overcome many of the objectionable features found in the prior art by providing a laser device which is both simple and inexpensive to manufacture and which has an increased efficiency over prior known devices.

A more particular object of the invention is to provide a laser device for producing light at high output power levels which employs a unitary element as the gas medium.

Another object of the invention is to provide a gas laser which does not require an optically resonant cavity to produce laser action.

Another object of the invention is to provide a gas laser device wherein a single reflective means may be employed in the discharge cavity if output from one end of the cavity is desired.

A further object of the invention is to provide a gas laser for producing light at high output power levels which employs a pulsed electric field as the gas discharge medium.

Yet another object of the invention is to provide a gas laser having a pulsed electric field wherein the pulse duration is greatly minimized to increase the efficiency of the device.

A still further object of the invention is to provide a gas laser having a self-terminating pulse and thereby eliminate the necessity of Q switches.

The teaching of the prior art with respect to the provision of a discharge in a single gas is set forth in U.S. Pat. No. 3,149,290 to which reference is made.

These objects of the invention, as well as other objects which will become apparent as the description proceeds, are achieved by providing a novel laser device wherein the driving electric field is applied across the discharge cavity perpendicular to the laser beam. The laser device as disclosed herein generally has an electrode extending along the length of the discharge cavity which electrode is provided with a fast-rise current pulse delivered from a capacitor bank through a pulse circuit.

This cross field geometry, in addition to eliminating the necessity of optically resonant cavities, enables high electric fields to be produced over a large volume of gas with easily manageable voltages. As a result, the present invention provides a laser having a higher peak power output than gas laser devices presently available on the market.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a perspective view of an embodiment of the invention taken partially in section showing portions of the laser device in detail;

FIG. 2 is a schematic view showing the electric circuit employed in the device of FIG. 1;

FIG. 3 is a side elevational view partially in section showing the device of FIG. 1 having portions of the structure omitted; and FIG. 4 is a sectional view taken along lines 4—4 of FIG. 3 showing elements of the structure in detail.

Referring to the drawings, especially FIG. 1, there is shown a laser device 10 having a base 11 mounted on a pair of supports 12 and 13. The base 11 is a U-shaped channel member (see FIG. 4) fabricated from any suitable conductive material, such as aluminum.

The base member 11, having two-leg portions 11a–11b and a bight portion 11c interconnecting the legs as shown in FIG. 4, serves both as a structural member as is evident from FIG. 1 and an electrode as schematically depicted in the circuit shown in FIG. 2.

Referring back to FIG. 1 taken in conjunction with FIGS. 3 and 4, the laser device 10 is further comprised of a pair of side walls 14 and 16 fabricated of a suitable insulating material such as Lucite acrylic resin, each having a relatively thin upwardly extending flange. The walls 14 and 16 are disposed in the base 11 with the respective stepped surfaces oppositely facing each other. An electrode member 17 is supported by the side walls 14 and 16 and disposed between the upwardly extending flanges of the walls, resting on their stepped surfaces. In addition to being suported in interfitting engagement between the side walls 14 and 16, the electrode member 17 serves to maintain the side walls in spaced relation and flanges 14 and 16 prevent arcing between electrode member 17 and base member 11. A plurality of spacers 18 are disposed adjacent the bottom surface 15 of the base 11 to maintain the lower portions of the side walls spaced one from another. The space thus provided between the side walls 14 and 16 defines a relatively thin elongated duct 19 extending from adjacent one end of the laser device 10 to the other end thereof.

A pair of feeder tubes 21 and 22 are located on the bottom surface of the base 11 and provide passages through the lower portion of the base, opening into the cavity 19.

Referring specifically to FIG. 1, there is shown a pair of panels 23 and 24, one disposed adjacent each end of the side walls 14 and 16 and serving to seal the ends of the cavity 19. The panels 23 and 24 are transparent to light at the wavelength of radiation produced in the cavity 19 and thus serve as windows for the laser beam emanating from the cavity. The panels 23 and 24 may be fabricated from quartz or other well known material having the desired properties as stated.

It should here be noted that the cavity 19 is generally maintained at a pressure other than atmospheric during the operation of the laser device 10. As is obvious, therefore, it is necessary to pressure seal the means defining the cavity 19. The various contacting surfaces between the side walls 14 and 16 and the base 11, the electrode member 17, and the panels 23 and 24 are therefore sealed by a suitable cement material to provide a relatively gas-tight enclosure in the cavity 19.

Referring still to FIG. 1, adjacent the transparent panel 24 there is disposed a mirror 26 having its reflective surface in contact with the panel 24. The mirror 26, as embodied in the device 10, is a first surface silvered mirror and may be cemented to the panel 24 along its edges or held in place by any other suitable means leaving the reflective surface unobstructed.

The electrode member 17 is provided with a plurality of jack receptacles 27 which are equally spaced along the length of the member. A cover member 28 fabricated of open metal grill work or other suitable conductive material is provided with a plurality of jacks 29 spaced for engagement with the jack receptacles 27 when the cover is positioned on the base 11. The cover member 28 may be removably attached to the base 11 as by bolts 31.

With the cover 28 in place, the end plate 32 is attached adjacent the closed end of the laser device 10 and a port plate 33 is fastened to the open end of the laser device.

The port plate 33 has provided therein an elongated opening 34 in alignment with the cavity 19 and substantially equal in area to the cross section of the cavity.

In FIG. 2 there is schematically shown means for applying a pulsed electric field across the cavity 19.

Referring now to that FIG. 2, taken in connection with FIG. 1, it will be noted that each of the jacks 29 are connected through the cover member 28 to a plurality of coaxial cables 36. The cables 36 are connected through a triggered spark gap 37 to a capacitor means 38, generally a capacitor bank. The energy for the capacitor means 38 is provided by a high voltage supply which is placed in series with a current limiting resistor 39. The coaxial cables 36 are grounded to the cover member 28 and serve to complete the circuit through the cover member and the base 11 to the gas in the cavity 19.

The spark gap 37 is triggered by a trigger circuit which is a commercially available device well known in the art. With the device shown, the circuit parameters are typically $L=.02$ microhenrie, $C=.03$ microfarad, with an initial capacitor voltage of 15 to 25 kilovolts.

OPERATION

To initiate operation of the laser device 10, a suitable gas supply is connected to the feeder tubes 21 and 22 and pumped through the cavity 19 at the desired rate and pressure. Typically, if the gas is pumped through the cavity 19 at a rate of approximately 20 cc.'s per second, for a device two meters in length having a pulse rate up to 20 pulses per second produced from the circuit, this is sufficient to keep the cavity 19 purged of foreign matter generated by the discharge in the gas.

The gas employed is any suitable gas having at least two energy levels above the ground energy level. During the electrical discharge, the net excitation rate for the higher of the two upper energy levels of the gas chosen should be greater than the net excitation rate of the lower of the two upper levels in order to produce an inversion between the two upper levels. Further, for optimum operation, the gas should provide a uniform discharge.

As previously mentioned, the gas commonly used in this device is nitrogen; however, neon has also been used successfully. Nitrogen, being a constituent of air, is inexpensive, readily available, and easily handled and for this reason is perhaps the most suitable gas for this application.

It has been found that the optimum gas pressure in the cavity 19 is approximately two centimeters of mercury for a device two meters in length.

With the gas flowing through cavity 19, a trigger pulse is applied to spark gap 37 to apply across the cavity normal to its longitudinal axis, through spark gap 37 and coaxial cables 36, the voltage across capacitor 38. This pulsed voltage or field is distributed along the electrode member 17 and provides a driving electric field applied across the cavity 19 perpendicular to the gas flow as best shown by the arrows in FIG. 1.

With this arrangement as described, the cross field voltage is supplied in excess of voltage necessary for ionization of the gas. The time between pulses should be for the case of diffusion cooling approximately the time required for a gas particle to diffuse from the center of the cavity to the cavity side wall and in the case of convection cooling, the time required for a gas particle to flow through the cavity.

At this point, mention should be made of the general configuration of the base 11. As disclosed in the introductory description, the base 11 is a U-shaped channel member of conductive material which serves both as a structural member and as a bottom electrode in the laser device 10. The base 11, here shown, is a relatively deep channel member which provides a high strength to weight ratio structure when assembled in the laser device 10.

In addition to its structural qualities, however, the base 11 is so constructed as to greatly minimize inductance in the electrical circuit.

In the laser device 10 described, the efficiency of the device depends to a great extent on the shortness of the pulses created in the circuit. For example, the radiative lifetime of the upper laser level for nitrogen is about 40 nanoseconds and 10 nanoseconds for neon. Therefore, in the circuit shown where the electrical pulse duration is held to a minimum, it is also necessary to keep the inductance to a minimum to permit a significant fraction of the current to be delivered within the length of the laser pulse duration.

This has been accomplished at least in part in the laser device 10 by providing the base 11, which serves as the lower electrode with upwardly extending legs 11a and 11b adjacent the cavity 19 and terminating at a point opposite the electrode 17. This configuration has been found to greatly minimize inductance in the circuit as the upwardly extending legs provide means for current flow in the circuit.

With regard to actual dimensions of the U-shaped channel member employed as the base 11, the thickness of the flanges are generally not determined by electrical requirements as the current preferably flows to the greatest extent possible along the inner surface of the base. However, for structural purposes, the channel member employed as the base 11 should have sufficient flange thickness to support the structure as a beam between the supports 12 and 13.

In operation, the discharge of the gas in the cavity 19 produces radiation in the form of the laser beam which is emitted at either end through the transparent panels 23 and 24. Should the mirror 26 be omitted from adjacent the panel 24, as would be obvious, the laser beam would be emitted from both ends of the cavity 19. Although the device is operative as described with the beam radiating from each end of the cavity 19, the addition of the mirror 26 serves the effectiveness of the device. However, since only one mirror is used, it will be apparent that the cavity is optically nonresonant.

Due to the extremely high optical gain and the short pulse duration, it has been found that employing a means for transmitting radiation from the device 10 in the form of the mirror 26 at one end of the discharge cavity with the opposite end left open to emission of radiated light produced maximum power in the laser device 10. With the mirror 26 disposed at one end of the cavity 19 the beam divergence emitter from the slotted opening 34 is reduced by one half in comparison with a beam emitted from a similar device having both ends open to emission of light. It can be concluded, therefore, that the device is amplifying the spontaneous emission originating from one end of the cavity 19 and that the mirror 26 serves to double the effective length of the laser device 10.

It should further be obvious that the introduction of the mirror 26 into the system is a simple expedient which does not complicate fabrication of the laser device 10. the mirror 26 into the system is a simple expedient which tion of the device 10 and alignment of the mirror is not critical as it need only be perpendicular to the longitudinal axis of the cavity 19 to the extent that there is substantially no reflection to the side walls of the cavity.

It has been found that with smooth channel side walls, which are good reflectors of the laser output wavelength, the output beam has several side lobes so that the power output is not well collimated. By providing rough non-reflecting side walls in accordance with the invention, as by sandblasting, the divergence angle of the output beam can be substantially decreased to provide a well collimated beam with a divergence angle substantially equal to the channel width divided by the channel length. Sandblasting the inner surfaces of the cavity intermediate its ends is effective to reduce the specular reflectivity of these surfaces.

Quantitative data on the power output relative to the active length of the discharge has been obtained for a laser device 10 as disclosed. For active discharge lengths less than 80 centimeters and power levels less than 10 kilowatts, the power gain is found to be 75 db per meter. For longer discharge lengths, the power output saturates and increases linearly with length. Operation of the device shown indicates a saturation power of $2 \times 10^3$ watts/cm.$^3$. A repetition rate of 100 p.p.s. has been achieved and a diffusion limited rate of 1000 p.p.s. may be expected if adequate heat transfer is provided.

The following table summarizes typical performance characteristics of the gas laser device 10 having an effective length of two meters and employing nitrogen as the discharge gas.

NITROGEN LASER CHARACTERISTICS

Output wavelength—$\lambda=3371$ A.
Band width—$\Delta\lambda \leq 1$ A.
Gain coefficient—75 db/meter.
Efficiency based on energy into gas up to the time the laser pulse terminates—$\epsilon=0.06\%$.
Efficiency based on energy stored in capacitor—$\epsilon=0.03\%$.
Beam divergence—$10^{-3}$ radians.
Peak power—200 kilowatts.
Laser pulse duration—$2 \times 10^{-8}$ seconds.
Energy per pulse—0.004 joule.
Repetition rate—0–100 p.p.s.
Average power—40 milliwatts.
Gas—Nitrogen.
Nitrogen pressure—2 cm. Hg.
Area of discharge cavity—$\frac{1}{8}''$ x $1''$.
Length of discharge cavity—2 meters.

In employing a laser device 10 of two meters in length, it has further been found that there is no need to provide external cooling to the device. However, where gas laser devices of this type are provided having a higher heat input rate to produce a higher power density than the device as characterized above, external cooling may be necessary. Further, if a nonflowing or static gas is provided in the cavity, care must be taken to prevent contamination of the gas resulting from the electric discharge therein.

From the foregoing, it is apparent that the various objects of the invention are achieved by providing a novel gas laser having a pulsed field applied to a cross field geometry. The arrangement permits the cross field voltage to be substantially in excess of the ionization potential of the gas, which gas may be a single element rather than gas mixtures as employed in prior art devices. As the efficiency depends on the shortness of pulses, a vast increase in efficiency is provided in the device over laser devices of the prior art.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. A laser device for producing pulses of light at high energy levels comprising:
   (a) means defining an elongated substantially optically nonresonant cavity having a longitudinal axis;
   (b) means for supplying to said cavity a gas having at least two energy levels above the ground energy level in which the net excitation rate for the higher of the two upper levels is greater than the net excitation rate for the lower of the two energy levels during electric discharge in said gas; and
   (c) pulse circuit means adapted to be connected to a pulsed source of high voltage electrical power, said pulse circuit means including first and second opposed electrode members communicating with said cavity for providing a pulsed electric discharge to produce an inversion between said two energy levels of said gas, said pulse circuit means additionally including a plurality of high voltage circuit means coupled to said first electrode member for providing said discharge at a plurality of different points along the length of said first electrode member whereby said discharge is substantially uniformly distributed along the length of said longitudinal axis and across said cavity normal to said longitudinal axis within the radiative lifetime of said higher state of about forty nanoseconds, said electrode means having an inductance whereby a significant fraction of the current in said discharge is delivered within the length of the laser pulse duration.

2. The combination as defined in claim 1 wherein at least a substantial portion of the inner surface of said cavity intermediate its ends has a small specular reflectivity.

3. A laser device for producing pulses of light at high energy levels comprising:
   (a) means defining an elongated substantially optically nonresonant cavity having a longitudinal axis;
   (b) means for supplying to said cavity a gas having at least two energy levels above the ground energy level in which the net excitation rate for the higher of the two upper levels is greater than the net excitation rate for the lower of the two energy levels during electric discharge in said gas; and
   (c) pulse circuit means adapted to be connected to a pulsed source of high voltage electrical power, said pulse circuit means including first and second opposed electrode members communicating with said cavity for providing a pulse electric field to produce an inversion between said two energy levels of said gas, said pulse circuit means including a plurality of further circuit means coupled to said first electrode member for providing said electric field at a plurality of different points along the length of said first electrode member whereby said electric field is substantially uniformly distributed along the length of said longitudinal axis and across said cavity normal to said longitudinal axis within the radiative lifetime of said higher state of about forty nanoseconds, said pulse circuit means including further conductive means for providing a current flow path adjacent and in series with the current flow path in said gas between said first and second electrodes for minimizing the inductance thereof whereby a significant fraction of the current in said discharge is delivered within the length of the laser pulse duration.

4. A laser device in accordance with claim 3 wherein said gas is nitrogen.

5. A laser device in accordance with claim 3 wherein said gas is neon.

6. A laser device in accordance with claim 3 which:
(a) further includes means adjacent said cavity for transmitting from said cavity radiation caused by inversion between the two upper energy levels of said gas; and
(b) wherein at least a substantial portion of the inner surface of said cavity intermediate its ends has a small specular reflectivity.

7. A laser device in accordance with claim 6 wherein said means for transmitting radiation from said cavity comprises:
(a) means disposed adjacent one end of said cavity for reflecting light at the wavelength of radiation caused by the inversion between the two upper energy levels of the gas; and
(b) means comprising the opposite end of said cavity which is at least substantially transparent to light at the wavelength of radiation caused by inversion between the two upper energy levels form emitting said light without substantially any reflection at said opposite end.

8. A laser device in accordance with claim 3 wherein said second electrode member comprises an elongated, electrically conductive substantially U-shaped base member having two leg portions and a bight portion interconnecting said leg portions, said bight portion defining the bottom of said cavity and being disposed normal to said electric field, and a pair of electrically nonconductive flanges extending adjacent and above the inner surface of each said leg portion.

9. A laser device in accordance with claim 8 wherein:
(a) said first electrode member defines at least a portion of one wall of said cavity; and further including
(b) a voltage source in series connection with switching means, said switching means being connected between said voltage source and said further means whereby said gas contained in said cavity is substantially uniformly excited.

10. In a laser device having a longitudinal axis, the combination comprising:
(a) first and second oppositely disposed electrode means spaced one from another and extending along said longitudinal axis;
(b) electrically nonconductive means disposed intermediate said electrode means to at least in part define with said electrode means an elongated duct;
(c) first and second electrically conductive surfaces forming a portion of said second electrode means and terminating adjacent but spaced from said first electrode means, said first and second surfaces extending substantially along the outer surfaces of said nonconductive means;
(d) means closing the ends of said channel to define in combination with said duct an elongated substantially optically nonresonant cavity, said cavity containing a gas at less than atmospheric pressure, said gas having at least two energy levels above the ground energy level in which the net excitation rate for the higher of the two upper energy levels is greater than the net excitation rate for the lower of the two energy levels during electric discharge in said gas; and
(e) a plurality of circuit means coupled to said first electrode means and said first and second surfaces remote from said first electrode means for providing a pulsed electric discharge through said gas and between said electrodes to produce an inversion between said two energy levels of said gas, said discharge being applied substantially uniformly along the length of said longitudinal axis and across said cavity normal to said longitudinal axis within the radiative lifetime of said higher state, said means having an inductance whereby a significant fraction of the current in said discharge is delivered within the length of the laser pulse duration.

11. The structure of claim 10 where said gas is nitrogen.

12. The structure of claim 10 wherein said means closing the ends of said channel includes:
(a) means disposed adjacent one end of said cavity for reflecting light at the wavelength of radiation caused by the inversion between the two upper energy levels of the gas; and
(b) means disposed at the opposite end of said cavity which is at least substantially transparent to light at the wavelength of radiation caused by inversion between the two upper energy levels.

13. The structure of claim 12 wherein said gas is nitrogen.

14. The structure of claim 13 wherein:
(a) said first electrode means and said first and second surfaces comprise an elongated U-shaped base member, and
(b) said electrically nonconductive means comprise a pair of electrically nonconductive walls disposed in spaced relation one adjacent each of said surfaces and extending between said surfaces and said second electrode means.

15. In the method of producing pulses of coherent radiation from a laser, the steps comprising:
(a) introducing into an evacuated and substantially optically nonresonant elongated region having a longitudinal axis, a gas having at least two energy levels above the ground energy level and in which the net excitation rate for the higher of the two upper levels is greater than the net excitation rate for the lower of the two energy levels during electric discharge in the gas; and
(b) applying a pulsed electric field simultaneously at a plurality of points along said longitudinal axis to provide a pulsed electric field substantially uniformly along the length of said longitudinal axis and across said region normal to said longitudinal axis to produce an inversion between said two energy levels of said gas, said pulsed electric field being at least substantially applied within the radiative lifetime of said higher state of about forty nanoseconds with an inductance sufficiently low that a significant fraction of said discharge is provided through said gas within the length of the laser pulse duration.

16. The method of producing coherent radiation comprising pulses of a high energy beam of light from a laser, the steps comprising:
(a) introducing into an evacuated and elongated region a gas having at least two energy levels above the ground energy level in which the net excitation rate for the higher of the two upper levels is greater than the net excitation rate for the lower of the two energy levels during electric discharge in said gas, said gas providing a substantially uniform discharge;

(b) applying a pulsed electric field simultaneously at a plurality of points along said longitudinal axis to provide a pulsed electric field substantially uniformly along said longitudinal axis and across said region normal to said longitudinal axis to produce an inversion between said two energy levels of said gas, said pulsed electric field being at least substantially applied within the radiative lifetime of said higher state of about forty nanoseconds with an inductance sufficiently low that a significant fraction of said discharge is provided through said gas within the length of said laser pulse duration; and (c) substantially reflecting said beam of light at only one end of said region whereby it is emitted at the opposite end of said region without substantially any reflection at said opposite end.

References Cited

UNITED STATES PATENTS

| | | | |
|---|---|---|---|
| 3,149,290 | 9/1964 | Bennett, Jr., et al. | 331—94.5 |
| 3,245,002 | 4/1966 | Hall | 331—94.5 |
| 3,253,226 | 5/1966 | Herriott et al. | 331—94.5X |
| 2,929,922 | 3/1960 | Schawlow et al. | 331—94.5X |
| 3,242,440 | 3/1966 | Koester et al. | 331—94.5 |
| 3,292,102 | 12/1966 | Byrne | 331—94.5 |
| 3,388,314 | 6/1968 | Gould | 331—94.5 |
| 3,396,301 | 8/1968 | Kobayashi et al. | 331—94.5 |

OTHER REFERENCES

Herriott, "Optical Properties . . ." J.O.S.A., vol. 52, No. 1, January 1962, pp. 31–37.

Paananen, "Parallel Gas Lasers . . ." Proc. IEEE, July 1963, pp. 1036–1037.

Nathan, IBM Tech. Disc. Bull., vol. 6, No. 4, September 1963, p. 64.

Smith, "Optical Maser . . ." J. App. Physics., vol. 35, No. 3, March 1964, pp. 723–724.

McFarlane, "Laser Oscillation . . ." App. Phys. Ltrs., vol. 5, No. 5, September 1964, pp. 91–93.

Patel, "Selective Excitation . . ." Phys. Rev. Ltrs., vol. 13, No. 21, November 1964, pp. 617–619.

Chebotayev, ". . . Neon Maser" Radio Eng. & Elec. Phys., vol. 10, February 1965, pp. 316–318.

IEEE Spectrum, vol. 2, No. 3, March 1965, p. 108.

Shernoch, "Series Triggering . . ." Rev. Sci. Inst., vol. 36, No. 3, March 1965, p. 392.

Hochuli, "Cold Cathode . . ." Rev. Sci. Inst., vol. 36, No. 10, October 1965, pp. 1493–1494.

RONALD L. WIBERT, Primary Examiner

W. A. SKLAR, Assistant Examiner

PO-1050
(5/69)

UNITED STATES PATENT OFFICE
CERTIFICATE OF CORRECTION

Patent No. 3,553,603         Dated January 5, 1971

Inventor(s) Donald A. Leonard

It is certified that error appears in the above-identified patent and that said Letters Patent are hereby corrected as shown below:

Column 1, line 29, for "mixture" read ---mixtures---; Column 5 line 5, after "serves" read ---to increase---; Column 5, line 15, for "emitter" read ---emitted---; Column 5, line 25, for "the" read ---The---; Column 5, lines 25 and 26, for "into the system is a simpl expedient which tion" read ---need only reflect the wavelength of operation---;

and Column 7, line 43, for "form" read ---for---.

Signed and sealed this 11th day of May 1971.

(SEAL)
Attest:

EDWARD M. FLETCHER, JR.
Attesting Officer

WILLIAM E. SCHUYLER, JR.
Commissioner of Patents